No. 780,741. Patented January 24, 1905.

UNITED STATES PATENT OFFICE.

RUDOLF BERENDES, OF ELBERFELD, GERMANY, ASSIGNOR TO FARBEN-FABRIKEN OF ELBERFELD CO., OF NEW YORK, N. Y., A CORPORATION OF NEW YORK.

SENSITIZING-DYE.

SPECIFICATION forming part of Letters Patent No. 780,741, dated January 24, 1905.

Application filed April 29, 1904. Serial No. 205,605.

*To all whom it may concern:*

Be it known that I, RUDOLF BERENDES, doctor of philosophy, chemist, residing at Elberfeld, Germany, (assignor to the FARBENFABRIKEN OF ELBERFELD COMPANY, of New York,) have invented a new and useful Improvement in New Sensitizing-Dyestuffs; and I do hereby declare the following to be an exact and clear description of my invention.

My invention relates to the production of new dyestuffs which are remarkable for their important property of imparting a greater sensibility to photographic emulsions for distinct colors of the spectrum, and the emulsion thus colored is equally sensitive for all colors of the spectrum. In this manner correct color values are obtained if multicolored objects are photographed. Hitherto screens colored with a solution of bichromate of potash were employed for this purpose; but such screens only corrected the blue rays. If corrections of other colors were desired, the time of exposure had to be excessively prolonged, so that a practical use of this bichromate-of-potash screen was excluded. By employing my new sensitizing-dyestuffs I do not only correct all color values, but I am also enabled to make instantaneous exposures. They are therefore important for preparing orthochromatic plates, films, or the like.

The process for the production of the new materials consists in causing caustic alkalies to act on the ammonium compounds, which can be prepared by heating quinaldin, the homologues, or substituted derivatives thereof with esters of sulfonic acids, such as the ethylic ester of ethyl sulfonic acid,

the methylic or ethylic ester of benzene or toluene sulfonic acid, or the like. One can also employ a mixture of the above-mentioned ammonium bases with one another or with the corresponding derivatives of quinolin, which can be obtained by the action of esters of sulfonic acids upon quinolin or its derivatives, such as bromoquinolin or the like. The new sensitizing-dyestuff thus produced are dark crystals which dye silk from a faintly-ammoniacal bath red and color the silver compounds of photographic emulsions red, thereby imparting greater sensibility to photographic emulsions for distinct colors of the spectrum.

In carrying out my new process practically I can proceed as follows, the parts being by weight: A mixture of one hundred and fifty-seven parts of paratoluquinaldin (2.6-dimethylquinolin) with two hundred parts of the ethylic ester of paratoluene sulfonic acid is heated to 130° centigrade until the formation of the soluble ammonium compound of the formula

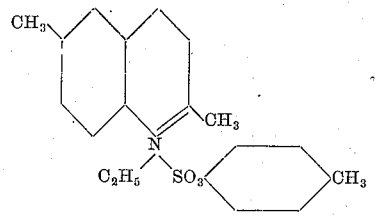

is completed. After being washed with ether the resulting ammonium base forms pink crystals melting at 120° centigrade. Three hundred and fifty-seven parts of this compound are then dissolved in six hundred parts of ethyl alcohol, and to the solution thus obtained, which is heated on the water-bath, thirty parts of potassium hydroxid dissolved in alcohol are slowly added. The resulting red solution is evaporated to dryness. The residue thus obtained is pulverized and extracted with ether in order to remove therefrom resinous by-products. The new sensitizing-dyestuff thus obtained is then crystallized from alcohol. It forms greenish-bronzy needles soluble in alcohol with a bluish-violet color, dyeing silk from a faintly-ammoniacal bath red with a bluish shade and coloring the silver compounds of photographic emulsions pinkish red with a bluish hue, thereby imparting greater sensibility to these emulsions for distinct colors of the spectrum.

Instead of the ethylic ester of paratoluene sulfonic acid other esters of sulfonic acids—such as the ethyl sulfonic esters, benzene-sulfonic esters, para-bromotoluene-sulfonic esters, or the like—may be employed.

The process proceeds in an analogous manner if instead of paratoluquinaldin quinaldin or other homologues or substituted derivatives thereof—such as the metatoluquinaldin, (2.7-dimethylquinolin,) chloro- or bromoquinaldin, or the like—are used or if mixtures of the above-mentioned ammonium bases with one another or with the corresponding bases derived from quinolin or its derivatives are employed.

The above-mentioned new ammonium bases obtainable from quinolin, quinaldin, or their derivatives and sulfonic esters are partly oils and partly crystals, most of them being very hygroscopic.

Having now described my invention and in what manner the same is to be performed, what I claim as new, and desire to secure by Letters Patent, is—

1. The herein-described new dyestuffs, being derivatives of quinaldin and of esters of sulfonic acids, which are dark crystals possessing the remarkable property of imparting greater sensibility to photographic emulsions for distinct colors of the spectrum, dyeing silk in a faintly-ammoniacal bath red, substantially as hereinbefore described.

2. The herein-described new dyestuff, obtainable by heating with caustic alkalies the ammonium compound which can be prepared by the action of the ethylic ester of paratoluene sulfonic acid upon quinaldin, which dyestuff forms greenish-bronzy needles soluble in alcohol with a bluish-violet color and possessing the remarkable property of imparting greater sensibility to photographic emulsions for distinct colors of the spectrum, dyeing silk in a faintly-ammoniacal bath red, substantially as hereinbefore described.

In testimony whereof I have signed my name in the presence of two subscribing witnesses.

RUDOLF BERENDES.

Witnesses:
OTTO KÖNIG,
HANS EVERSBERG.